SUPPRESSION OF TRANSIENTS AT THE OUTPUTS OF TRANSISTOR SWITCHING CIRCUITS

Filed March 8, 1965 2 Sheets-Sheet 1

INVENTOR
Eric Metcalf
BY Kemon, Palmer, Stewart & Estabrook
ATTORNEYS

INVENTOR
Eric Metcalf
BY Kemon, Palmer,
Stewart & Estabrook
ATTORNEYS

United States Patent Office 3,372,287

Patented Mar. 5, 1968

3,372,287

SUPPRESSION OF TRANSIENTS AT THE OUTPUTS OF TRANSISTOR SWITCHING CIRCUITS

Eric Metcalf, Headley, Bordon, England, assignor to The Solartron Electronic Group Limited, Farnborough, England, a British company Filed Mar. 8, 1965, Ser. No. 437,664
11 Claims. (Cl. 307—240)

ABSTRACT OF THE DISCLOSURE

A circuit for connecting and disconnecting two terminals is described, which uses two transistors with their emitter-collector paths back to back, or one double emitter transistor with its emitter-collector paths back to back. A switching voltage is applied to the transistor or transistors when they are to conduct, and the switching voltage is prevented from reaching the two terminals by the addition of a capacitor or capacitors to the circuit, connected as part of a balanced bridge circuit. The switching voltage is applied across opposite corners of the bridge, and the two terminals form another pair of opposite corners.

The present invention is concerned with reducing the transient voltages and currents which occur at the time of switching in transistor switching circuits, particularly but not exclusively, transistor chopper circuits.

Chopper circuits are used principally to convert D.C. into A.C. Where a D.C. signal of low level is to be amplified it is often converted into A.C. to make amplification simpler. A drift corrected amplifier can be made in this way as is described on page 200 of "Electronic Analogue Computers" by Korn and Korn, published by McGraw Hill.

Chopper circuits consist basically of a switch connected across a D.C. source. The switch is continuously switched on and off, and the output is taken across the switch. The output therefore consists alternately of the full source voltage while the switch is open circuit and no output voltage while the switch short circuits the source. The source is usually connected through a resistor to the switch so that the short circuit current is limited.

There is thus developed an output voltage of average magnitude half the average magnitude of the signal applied to the switch. Any voltage developed across the switch when it conducts causes an error in the average voltage magnitude applied to any amplifier connected at the chopper output. Such an error voltage is usually present in choppers using transistor switches, because of the collector-emitter voltage drop of a conducting transistor.

One known technique (see an article by Chaplin in Proc. I.E.E., vol. 105B, November 1957, page 249) utilised a transistor driven by a square wave at its base. In addition an antiphase square wave is applied to the collector (which is connected to earth through a load resistor) so as to bring the emitter to 0 volts when the transistor is conducting.

An improved circuit utilising only one driving waveform has two transistors with their emitter-collector paths in series back to back so that the emitter-collector drops substantially cancel. The transistors are switched on and off together by a square wave applied to their bases.

At high switching speeds neither of these known circuits is entirely satisfactory because the capacitances of the transistors become important and introduce transients. The transients which arise at the times of switching lead to leakage currents which flow in any following amplifier causing errors in its output signal. These transients can be made small at switch-on by the choice of high speed transistors but a more persistent transient occurs at the time of switch-off.

According to the first aspect of the present invention there is provided a switching circuit comprising two transistors (or a transistor having two emitters), the two emitter-collector paths of which are connected in series back to back between two terminals which are, in operation, to be connected and disconnected by the switching circuit in response to a variable voltage applied to the transistor or transistors, which is varied to switch the switching circuit between its on and off conditions, wherein a variable capacitor is used either alone or with fixed capacitors to form a bridge circuit with the interelectrode capacities of the transistor or transistors, and stray circuit capacities, the variable voltage being applied to a first pair of terminals of this bridge, and the bridge being such that any voltage or voltage variation at the first pair of terminals does not cause either a voltage or a voltage variation at the said two terminals.

The inter-electrode capacities of a transistor are voltage dependent and are best represented by a ladder network of capacitors and resistors rather than a pure capacity. For this reason when forming a bridge circuit it is best to allow similar capacities, such as those of two transistors or a double emitter transistor, to balance each other out as far as possible while the main remaining capacitive unbalance is balanced by a variable capacitor. The fact that the capacities are not pure may mean that the bridge can never be exactly balanced, but balance will be sufficient to reduce transients significantly.

The switching circuit may comprise two transistors connected between the said two terminals, the transistors having their two collectors connected together, the emitter of one transistor being connected to one of the two terminals and the emitter of the other transistor being connected to the other of the two terminals. In this circuit the variable voltage is applied between the connected collectors and the bases of the transistors which are either connected directly or are connected through two resistors. The variable capacitor is connected between the emitter and collector of one transistor, and, forms a bridge with the stray capacities and inter-electrode capacities of the transistors.

Alternatively, the switching circuit may consist of a single double emitter transistor, one of the said two terminals being connected to one emitter and the other to the other emitter, the variable voltage being applied between the base and the collector. In this circuit the bridge is completed by the addition of the variable capacitor between the one terminal and the collector of the transistor. A further fixed capacitor may be connected between the other of the two terminals and the collector.

According to a second aspect of the invention the variable voltage may be supplied by a circuit having a means adapted to provide an alternating voltage when the switching circuit is to conduct and which has no output voltage when the switching circuit is to be nonconducting and a transformer having a primary winding connected to the means providing the alternating voltage and a secondary winding connected to a rectifier circuit which produces a steady voltage to switch the transistor or transistors "on" when the alternating voltage is provided.

The transformer secondary winding may be centre tapped and the rectifier circuit may comprise two rectifiers, one connected to one end of the secondary winding and the other connected to the other end of the secondary winding. The steady voltage is then taken from the ends of the rectifiers, not connected to the secondary winding, and the centre tap of the secondary winding.

In order to keep the stray capacities of the transformer small the frequency of the alternating voltage may be approximately 5 mc./s.

Either of the above switching circuits may be used in a chopper circuit where a steady input voltage is alternately either passed to an output terminal or short circuited through the switch. In such a circuit the variable voltage is an alternating voltage of any suitable waveform.

Certain embodiments of the invention will now be described, by way of example only, with reference to the accompanying drawings in which.

Figures 1, 2, 3:
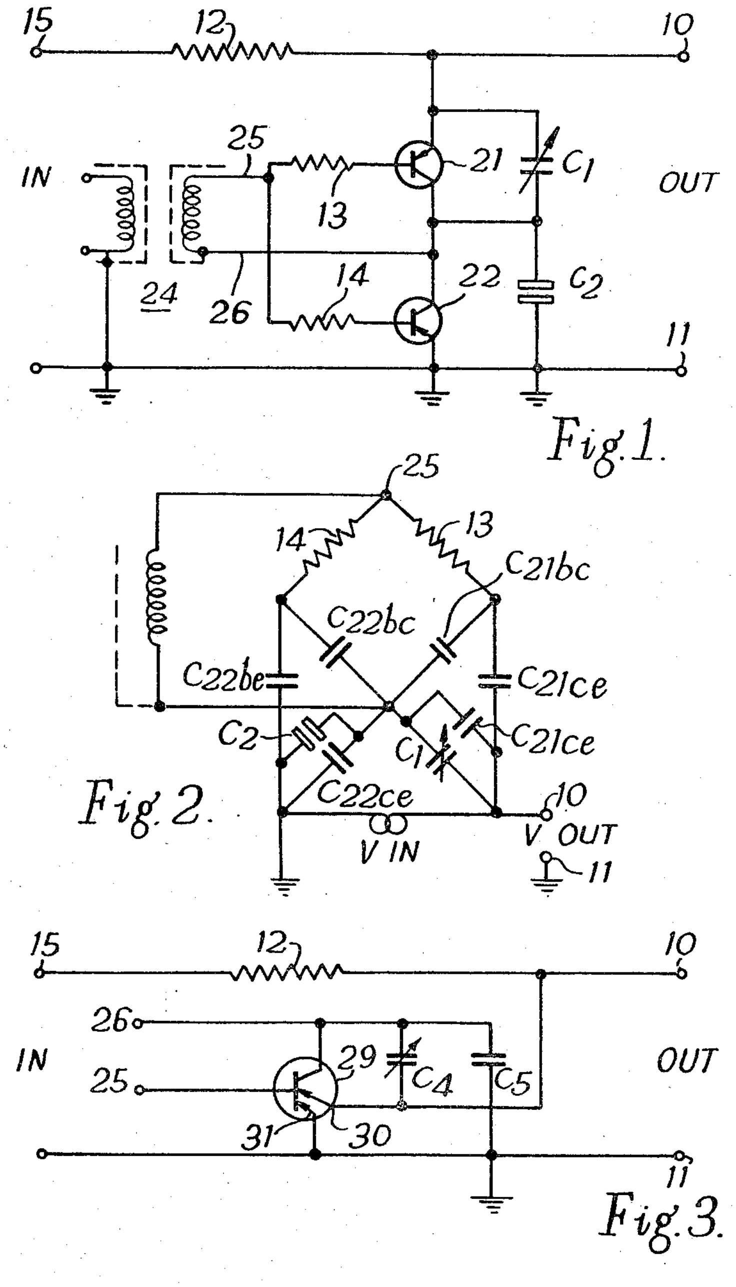
FIG. 1 is the circuit diagram of one chopper circuit embodying the invention.
FIG. 2 is a diagram of a bridge circuit showing the capacities which occur in the circuit of FIG. 1.
FIG. 3 is a circuit diagram of another chopper circuit, embodying the invention.

The circuit shown in FIG. 1 comprises two PNP transistors 21 and 22 having their collectors connected together and their emitters connected to live and earthed output terminals 10 and 11 respectively. The live input terminal 15 is connected to the live output terminal through a resistor 12 for limiting the current when the transistors are "on." In operation the transistors are repeatedly switched on and off together by means of a square wave applied by way of a transformer 24. One end 26 of the transformer secondary is connected to the collectors of the transistors: the other end 25 is connected to the bases through separate resistors 13 and 14.

The circuit so far described is known and has the advantage that the emitter-collector drops of the two transistors cancel when the transistors are "on." It has the disadvantage that the interelectrode capacities introduce transients, at least when switching off.

In carrying out the first aspect of the present invention, a variable capacitor $C_1$ is added across the emitter-collector path of the transistor 21. The effect of this capacitor is best seen in FIG. 2 where the circuit of FIG. 1 has been redrawn in the form of a bridge circuit to show the capacities in the circuit. The transistor capacities are labelled in FIG. 2 using a code, the first subscript being the number of the transistor and the second and third subscripts being the electrodes between which the capacity occurs. For Example $C_{22be}$ is the capacity between the base and emitter of the transistor 22.

Adjustment of capacitor $C_1$ allows the bridge to be balanced and any switching voltage which appears across terminals 25 and 26 will not appear across terminals 10 and 11. The output voltage is thus free of transient switching voltages.

It is preferred to add another capacitor $C_2$ across the emitter-collector path of the transistor 2. The capacitor $C_2$ is used to swamp the internal collector-to-emitter capacitance of the transistor 2 and the stray capacities of the transformer windings and the wiring. By using a known capacitor $C_2$ of convenient value the bridge can be more easily balanced.

If the bridge is to remain stably balanced, the unbalance capacity on the driver transformer 24 must be stabilised, for example by using a double-screened transformer as shown schematically in FIG. 1.

Another embodiment of the first aspect of the invention is shown in FIG. 3. Here a single transistor with two emitters 30 and 31 replaces the two transistors 21 and 22 of FIG. 1. The commoned collectors of these transistors can be imagined as having been combined into one collector and the switching voltage is applied between a single common base and the collector.

Figure 4:
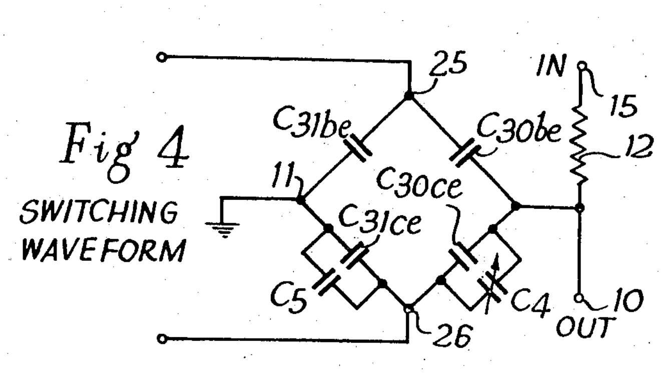
FIG. 4 is a diagram of a bridge circuit showing the capacities which occur in the circuit of FIG. 3.

A variable capacitor $C_4$ has the same function as $C_1$ in FIG. 2 and a fixed capacitor $C_5$ has the same function as $C_2$. The bridge circuit for this chopper is shown in FIG. 4 and is a simplified version of FIG. 2.

The advantages of a double emitter transistor are that better cancellation of the emitter-collector voltage drops and better balance of the bridge are obtained.

Figure 5:
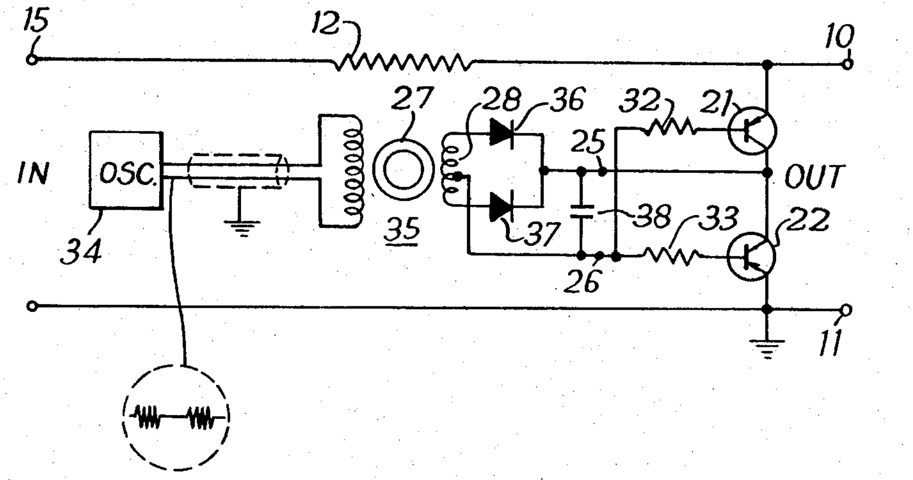
FIG. 5 shows a circuit according to the second aspect of the invention, for supplying a variable switching voltage to a chopper circuit.

In any of the circuits described the variable switching voltage which is required at terminals 25 and 26 or similar terminals may be supplied by the drive circuit connected to the left of terminals 25 and 26 in FIG. 5. The drive circuit forms the second aspect of the invention, and in FIG. 5 it is shown connected to a known circuit.

In FIG. 5 an oscillator 34 produces a drive signal consisting of blocks of sinusoidal oscillations, having a frequency of 5 mc./s., at a repetition frequency of 5 kc./s., i.e. a 5 mc./s. sinusoidal voltage modulated by a 5 kc./s. square wave. This drive signal is passed to a transformer 35 having a toroidal core 27 and a centre tapped secondary winding 28. The blocks of 5 mc./s. oscillations are rectified by the diodes or rectifiers 36 and 37 and smoothed by the capacitor 38. Thus, a steady voltage appears across the capacitor 38 whenever a block of oscillations is produced by the oscillator 34. This voltage is applied between the base and collectors of the transistors 21 and 22, base resistors 32 and 33 being included.

At the frequencies described the toroid is small and thus stray capacities in the transformer are small. Since there is no switching off voltage but only a lack of switching voltage, the switching off transients are reduced.

What is claimed is:

1. A switching circuit comprising:
first and second terminals;
a transistor, having first and second emitter electrodes, a base electrode and a collector electrode, the two emitter-collector paths of said transistor being connected in series back to back between said first and second terminals;
a third terminal coupled to said base electrode;
a fourth terminal coupled to said transistor;
switching means coupled between said third and fourth terminals for switching said transistor between conducting and non-conducting states, to connect and disconnect said first and second terminals; and
a capacitor connected between said first emitter electrode and said collector electrode, to form a balanced bridge comprising capacities between said electrodes, and said capacitor, said bridge having said first and second terminals coupled to one pair of opposite corners thereof, and said third and fourth terminals coupled to another pair of opposite corners, so that voltage from said switching means does not appear between said first and second terminals.

2. A circuit according to claim 1 wherein:
the switching means is connected between the said base and said collector of said transistor; and
said first and second terminals are separately connected to the two emitters of said transistor.

3. A circuit according to claim 2 further comprising a further capacitor connected between the said collector electrode of said transistor and said second emitter electrode.

4. A switching circuit according to claim 1 wherein said switching means comprises:
means adapted to provide a mark-space signal wherein the "marks" are bursts of oscillations;
a transformer having primary and secondary windings, the primary winding being connected to said mark-space means;
two output terminals for said switching means; and
a rectifier means connected to said secondary winding whereby a steady output voltage is provided at said output terminals during said bursts and there is no output voltage at other times.

5. A switching circuit according to claim 4 wherein said transformer secondary winding is center tapped, and said rectifier means comprises two rectifiers with their anodes separately connected to the ends of said transformer secondary windings, and their cathodes connected together and to one of said output terminals, the other of said output terminals being connected to said center tap.

6. A switching circuit according to claim 3 wherein said switching means comprises:

means adapted to provide a mark-space signal wherein the "marks" are bursts of oscillations;

a transformer having primary and secondary windings the primary winding being connected to said mark-space means;

two output terminals for said switching means; and a rectifier means connected to said secondary winding whereby a steady output voltage is provided at said output terminals during said bursts and there is no output voltage at other times.

7. A switching circuit according to claim 6 wherein:

said transformer secondary winding is center tapped, and said rectifier means compirses two rectifiers each having corresponding first and second electrodes, said first electrodes being separately connected to the ends of said transformer secondary windings, and said second electrodes connected together and to one of said output terminals, the other of said output terminals being connected to said center tap, said output terminals being separately connected to said collector and said base of said transistor.

8. A switching circuit comprising:

first and second terminals;

two transistors each having base, emitter and collector electrodes, emitter collector paths of said transistors being connected in series back to back between said first and second terminals, said collector electrodes being coupled together;

means separately connecting said first and second terminals to the emitters of said transistors;

a third terminal;

first and second coupling means coupling said third terminal to said base electrodes of said transistors respectively;

a fourth terminal coupled to the juncture of said emitter collector paths;

a capacitor connected between said emitter electrode and said collector electrode of said first transistor, to form a balanced bridge comprising capacitors between said electrodes of said transistors, said first and second coupling means and said capacitor, said bridge having said first and second terminals coupled to opposite corners thereof, and said third and fourth terminals coupled to another pair of opposite corners;

switching means coupled between said third and fourth terminals and connected between said bases and said coupled collectors for switching said transistors between conducting and non-conducting states, to connect and disconnect said first and second terminals, said switching means including means to provide a mark space signal wherein the "marks" are bursts of oscillations, a transformer having primary and secondary windings, the primary winding being connected to said mark space means, two output terminals for said switching means and a rectifier means connected to said secondary winding whereby a steady output voltage is provided at said output terminals during said burst and there is no output voltage at other times.

9. A switching circuit according to claim 8 wherein said transformer secondary winding is center tapped, and said rectifier means comprises two rectifiers each having corresponding first and second electrodes, said first electrodes being separately connected to the ends of said transformer secondary windings, and said second electrodes connected together and to one of said output terminals, the other of said output terminals being connected to said center tap.

10. A switching circuit according to claim 9 in which said output terminals are separately connected to said coupled bases and said coupled collectors.

11. A switching circuit comprising:

first and second terminals;

two transistors, each having base, emitter and collector electrodes, emitter-collector paths of said transistors being connected in series back to back between said first and second terminals, said collectors being coupled together and said first and second terminals being separately connected to the emitters of said transistors;

a third terminal;

first and second coupling means coupling said third terminal to said base electrodes of said transistors, respectively;

a fourth terminal coupled to the juncture of said emitter-collector paths;

switching means coupled between said third and fourth terminals and between said bases and said coupled collectors for switching said transistors between conducting and non-conducting states, to connect and disconnect said first and second terminals;

a capacitor connected between said emitter electrode and said collector electrode of said first transistor, to form a balanced bridge comprising capacities between said electrodes of said transistors, said first and second coupling means, and said capacitor, said bridge having said first and second terminals coupled to one pair of opposite corners thereof, and said third and fourth terminals coupled to another pair of opposite corners, so that voltage from said switching means does not appear between said first and second terminals; and a further capacitor connected between the emitter and collector of said second transistor.

References Cited

UNITED STATES PATENTS

| | | | |
|---|---|---|---|
| 2,006,806 | 7/1935 | Hagen | 328—32 X |
| 2,802,909 | 8/1957 | Foster et al. | 330—76 X |
| 3,038,088 | 6/1962 | Rosenberg | 307—88.5 |
| 3,089,963 | 5/1963 | Djorup | 307—88.5 |

OTHER REFERENCES

R. L. Bright: "Junction Transistors Used AC Switches," in AIEE Transactions, d+d, March 1955, page 120 (FIG. 24) is pertinent.

Hurley: Junction Transistor Electronics, 1958, pages 380–382 are pertinent.

ARTHUR GAUSS, *Primary Examiner.*

S. D. MILLER, *Assistant Examiner.*